(12) United States Patent
Brütsch et al.

(10) Patent No.: US 12,535,345 B2
(45) Date of Patent: Jan. 27, 2026

(54) MAGNETIC-INDUCTIVE FLOWMETER

(71) Applicant: Endress+Hauser Flowtec AG, Reinach (CH)

(72) Inventors: Tobias Brütsch, Basel (CH); Simon Mariager, Basel (CH); Markus Rufenacht, Diepflingen (CH); Werner Wohlgemuth, Seewen (CH)

(73) Assignee: Endress+Hauser Flowtec AG, Reinach (CH)

( * ) Notice: Subject to any disclaimer, the term of this patent is extended or adjusted under 35 U.S.C. 154(b) by 384 days.

(21) Appl. No.: 18/252,373

(22) PCT Filed: Sep. 23, 2021

(86) PCT No.: PCT/EP2021/076266
§ 371 (c)(1),
(2) Date: May 10, 2023

(87) PCT Pub. No.: WO2022/100917
PCT Pub. Date: May 19, 2022

(65) Prior Publication Data
US 2023/0417584 A1 Dec. 28, 2023

(30) Foreign Application Priority Data
Nov. 11, 2020 (DE) .................... 10 2020 129 772.6

(51) Int. Cl.
*G01F 1/58* (2006.01)
*G01F 1/60* (2006.01)
*G01F 25/10* (2022.01)

(52) U.S. Cl.
CPC ................ *G01F 1/584* (2013.01); *G01F 1/60* (2013.01); *G01F 25/10* (2022.01)

(58) Field of Classification Search
CPC ............. G01F 1/584; G01F 1/60; G01F 25/10
(Continued)

(56) References Cited

U.S. PATENT DOCUMENTS

| 4,513,624 A | 4/1985 | Mchale et al. |
| 2017/0160114 A1 | 6/2017 | Saito et al. |

(Continued)

FOREIGN PATENT DOCUMENTS

| CN | 101769770 A1 | 7/2010 |
| CN | 104823027 A1 | 8/2015 |

(Continued)

*Primary Examiner* — Peter J Macchiarolo
*Assistant Examiner* — John M Royston
(74) *Attorney, Agent, or Firm* — Christopher R. Powers; Endress+Hauser (USA) Holding, Inc.

(57) ABSTRACT

The present disclosure relates to a magnetic-inductive flowmeter, comprising: a measuring pipe for conducting a medium, wherein the measuring pipe comprises an electrically insulating measuring pipe body; a device for generating a magnetic field that penetrates the measuring pipe body; a device for detecting an induced voltage, which is a function of a flow rate; a reference electrode; an electrode assembly for detecting damage to the measuring pipe body, wherein the electrode assembly is electrically insulated from the reference electrode and/or the medium by the measuring pipe body; a measuring circuit configured to measure a variable that is a function of an electrical impedance between the electrode assembly and the reference electrode.

9 Claims, 4 Drawing Sheets

(58) Field of Classification Search
USPC .................................................... 73/861.12
See application file for complete search history.

(56) References Cited

U.S. PATENT DOCUMENTS

| | | |
|---|---|---|
| 2017/0176363 A1 | 6/2017 | Pennington et al. |
| 2018/0031400 A1 | 2/2018 | Tower, III et al. |
| 2019/0277679 A1* | 9/2019 | Tschambser ............. G01F 1/588 |
| 2020/0049634 A1* | 2/2020 | Aljindan ................... G01F 1/74 |

FOREIGN PATENT DOCUMENTS

| | | | |
|---|---|---|---|
| DE | 102004062680 A1 | 6/2006 | |
| DE | 102005044972 A1 | 3/2007 | |
| DE | 102008054432 A1 * | 6/2010 | ............. G01F 1/584 |
| EP | 0766069 A1 | 4/1997 | |
| FR | 2300995 A1 | 9/1976 | |
| JP | 2006250692 A | 9/2006 | |
| WO | 2010066518 A1 | 6/2010 | |

\* cited by examiner

Fig. 1

PRIOR ART

MAGNETIC-INDUCTIVE FLOWMETER

CROSS-REFERENCE TO RELATED APPLICATIONS

The present application is related to and claims the priority benefit of German Patent Application No. 10 2020 129 772.6, filed on Nov. 11, 2020, and International Patent Application No. PCT/EP2021/076266, filed Sep. 23, 2021, the entire contents of which are incorporated herein by reference.

TECHNICAL FIELD

The present invention relates to an electromagnetic flowmeter, in particular a magnetic-inductive flowmeter for measuring the volume or mass flow of a fluid or a flowable solid substance, wherein the fluid flows through the instrument in a continuous flow.

BACKGROUND

Magnetic-inductive flowmeters are used for determining the flow rate and the volumetric flow of a flowing medium in a pipeline. A magnetic-inductive flowmeter has a magnet system that generates a magnetic field perpendicular to the direction of flow of the flowing medium. Single coils are typically used for this purpose; permanent magnets less frequently. In order to realize a predominantly homogeneous magnetic field, pole shoes are additionally formed and attached to the measuring pipe such that the magnetic field lines run over the entire pipe cross-section substantially perpendicularly to the transverse axis or in parallel to the vertical axis of the measuring pipe. A measurement electrode pair attached to the lateral surface of the measuring pipe taps an electrical measurement voltage or potential difference in the medium which is applied perpendicularly to the direction of flow and to the magnetic field and occurs when a conductive medium flows in the direction of flow when the magnetic field is applied. Since, according to Faraday's law of induction, the tapped measurement voltage is a function of the velocity of the flowing medium, the flow rate u and, with the inclusion of a known tube cross-section, the volumetric flow 1 can be determined from the induced measurement voltage U.

Magnetic-inductive flowmeters are often used in process and automation engineering for fluids, as of an electrical conductivity of approximately 5 µS/cm. Corresponding flowmeters are sold by the applicant in a wide variety of embodiments for various fields of application, for example under the name PROMAG.

Due to the high mechanical stability required for measuring pipes of magnetic-inductive flowmeters, said pipes usually consist of a metallic carrier tube of predeterminable strength and width, which is lined internally with an electrically insulating material of predeterminable thickness, the so-called liner. For example, DE 10 2005 044 972 A1 and in DE 10 2004 062 680 A1 each describe magnetic-inductive measuring sensors which comprise a measuring sensor, which can be inserted into a pipeline and comprise an inlet-side first end and an outlet-side second end, with a non-ferromagnetic carrier tube as an outer sheath of the measuring pipe, and a tubular lining, which is accommodated in a lumen of the carrier tube and consists of an electrically insulating material, for conducting a flowing process medium which is electrically insulated from the carrier tube.

The lining, which is typically made of a thermoplastic, thermosetting and/or elastomeric plastic, serves, inter alia, for chemical insulation of the support tube from the process medium. In magnetic-inductive measuring sensors, with which the carrier tube has a high electrical conductivity, for example, when using metallic carrier tube, the lining also serves for electrical insulation between the carrier tube and the process medium, which prevents short circuiting of the voltage induced in the process medium via the carrier tube. A corresponding design of the support tube thus makes it possible to adapt the strength of the measuring pipe to the mechanical stresses present in the respective case of use, while by means of the lining an adaptation of the measuring pipe to the electrical, chemical and/or biological requirements applicable for the respective case of use can be realized.

Often, a so-called support body, which is embedded in the lining, is used for fastening the lining. In the patent specification EP 0 766 069 B1, for example, a perforated tube welded to the carrier tube serves as a support body. The support body is connected to the carrier tube and embedded in the lining by applying the material from which the lining is made, internally in the carrier tube. Furthermore, a measuring pipe with a metal housing has become known from patent specification U.S. Pat. No. 4,513,624 A for mechanical stabilization and for electrical shielding. For this purpose, the metal housing surrounds a pipeline leading to the medium.

Furthermore, magnetic-inductive flowmeters which have a measuring pipe body formed from an electrically insulating material, for example plastic, ceramic and/or glass are known. With such measuring pipes, an insulating coating is dispensed with.

It has been shown that the electrically insulating lining, but also the measuring pipe body formed from an electrically insulating material, is subject to erosion despite the use of heavy-duty materials. In particular, the solid particles, such as, for example, sand, gravel and/or rock, cause abrasion of the lining of the pipeline or of the measuring pipe body. The abrasion or deformation of the lining or of the electrically insulating measuring pipe body causes the flow profile of the measuring sensor to change. As a result, the measuring device delivers faulty measured values for the volume or mass flow. In addition, the chemical or electrical insulation between the process medium and the carrier tube is lost when measuring pipes have an internal lining.

WO 2010/066518 A1 discloses a measuring device for determining a volumetric and/or mass flow of a process medium flowing through a measuring pipe. The measuring pipe comprises a carrier tube with an internal lining, comprising a first layer and a second layer, and a monitoring electrode embedded between the first layer and the second layer and configured to detect damage to the second/first layer. However, the disadvantage of this is the influencing of the monitoring on the measurement of the volume flow and/or mass flow.

SUMMARY

The object of the present invention is therefore to provide an alternative solution for a magnetic-inductive flowmeter, with which damage by abrasion to the lining and/or the electrically insulating measuring pipe body can be detected without impairing the measurement performance.

The object is achieved by the magnetic-inductive flowmeter according to the present disclosure.

The magnetic-inductive flowmeter according to the invention comprises:
- a measuring pipe for guiding the medium,
  - wherein the measuring pipe comprises measuring pipe body which is electrically insulating in sections,
- a device for generating a magnetic field that penetrates the measuring pipe body;
- a device for detecting an induced voltage, which is a function of a flow rate;
- a reference electrode;
- an electrode assembly for detecting damage to the measuring pipe body;
  - wherein the electrode assembly is electrically insulated from the reference electrode and/or the medium via the measuring pipe body; and
- a measurement circuit configured to measure a variable that is a function of an electrical impedance between the electrode assembly and the reference electrode.

The section-wise electrical insulation of the measuring pipe body can be realized by an electrically insulating lining which is applied to the inside of a metallic and thus conductive carrier tube. Alternatively, the measuring pipe body can be formed from an electrically insulating plastic, a ceramic and/or glass.

The impedance—also referred to as alternating current resistance—is an electrical resistance in alternating current technology and, in the case of a two-pole network element, indicates the ratio of electrical voltage to current intensity. The term is used in particular when there is a phase shift between the two variables, whereby the ratio differs from the resistance determined by means of direct current. The impedance is advantageously indicated as a complex function of the frequency. It is the combination of the ratio of the amplitudes of a temporally variable alternating voltage to a temporally variable alternating current and the displacement of the phase angles between these two variables. Both properties are mathematically combined by representing the impedance as a complex variable, in particular by a real value of the complex impedance, the apparent resistance, and the imaginary part, which by an exponential function with the imaginary unit and the phase shift angle in the exponent, can assume values between −90° and 90°. In other words, the impedance has a real and imaginary part. The phase-shifting component is frequency dependent, the non-phase-shifting component can be a function of the frequency, but is generally independent of frequency at least for a frequency range used in electronics.

The measuring circuit is configured to impose a temporally variable excitation signal on the electrode assembly, in particular with at least one excitation frequency. The excitation signal is generated with a voltage source on the electrode assembly against a reference potential, preferably against the ground potential. Furthermore, the measuring circuit is configured to measure a measurement signal on the electrode assembly.

According to one embodiment, the excitation signal is an alternating voltage signal, in particular a multi-frequency voltage signal. The excitation signal is designed as an alternating voltage signal, since DC voltage signals ensure disruptions to the flow measurement. It is advantageous if the frequency of the alternating voltage signal is in a frequency range of 1 Hz to 10 kHz. With the multi-frequency voltage signal, the voltage values change periodically with at least two frequencies. Advantageously, the alternating voltage signal has a first frequency for a first time interval and then changes the frequency of the alternating voltage signal for a subsequent second time interval.

The function of a reference electrode is to ensure potential equalization between fluid and measuring sensor. Reference electrodes are typically grounding disks and/or electrodes arranged on the end face, which are generally pin, mushroom head or brush electrodes and which are arranged in an opening in the measuring pipe jacket, typically in contact with the medium in a common measuring plane with the measuring electrodes. Typically, the reference electrode is electrically connected to the housing of the measuring electronics of the pipeline. The housing is typically connected to the protective grounding. Magnetic-inductive flowmeters are already commercially available, the reference electrode of which is ungrounded.

A measuring circuit is a combination of electrical or electromechanical components (such as, for example, amplifiers, terminals, analog-to-digital converters, transistor, battery, switches, display, etc.) forming a functional arrangement. The circuit becomes usable thanks to an electric current through its components; to this end, at least one electrical energy source contained in the circuit is required in a closed circuit. This can be realized internally as a battery or as an external energy source. The measuring circuit can have individual functional elements which can perform logical operations.

Advantageous embodiments of the invention are the further subject matter of the present disclosure.

One embodiment provides that the electrode assembly comprise at least one monitoring electrode,
- wherein the monitoring electrode has a monitoring electrode longitudinal direction,
- wherein the monitoring electrode has a material thickness D,
- wherein the material thickness D in the longitudinal direction of the monitoring electrode increases preferably in steps at least in part.

An advantage of the partial increase in the material thickness is that, for example, in the case of an especially homogeneous abrasion of the monitoring electrode, a contact surface of the monitoring electrode that is in galvanic contact with the medium increases. This is reflected in the measurement signal, as a result of which a determination of how much the liner has already been removed can be made on the basis of the changing measurement signal or the variable that is a function of the impedance.

The existence of a stepped increase in the material thickness has the advantage that, in the event of abrasion of the monitoring electrode, the contact surface with the medium increases discretely rather than continuously, which in turn affects the measurement signal. Thus, a degree of abrasion or a remaining liner thickness can be determined on the basis of a step-like change in the measurement signal.

One embodiment provides that the at least one monitoring electrode is at least partially hollow-cylindrical or annular.

One embodiment provides for the measuring pipe body to have a longitudinal direction of the measuring pipe body,
- wherein the at least one monitoring electrode is oriented coaxially to the measuring pipe body and is arranged offset to the reference electrode in the longitudinal direction of the measuring pipe body.

The at least one monitoring electrode is preferably arranged on the input and/or output side, so that the measuring pipe has a measuring pipe section in which the device for detecting the induced voltage, which is a function of the flow rate, in the medium arranged, but which is free of a monitoring electrode. This has the advantage that, in the event of an abrasion-related short circuit at several points on the monitoring electrode, the measurement influence on the voltage applied to the device for detecting the induced voltage, which is a function of the flow rate, is minimal.

In addition, such a configuration has the advantage that damage to the measuring pipe body or the lining is detectable not only locally and thus selectively, but over a larger region.

One embodiment provides that the reference electrode extends through the measuring pipe body,
wherein the at least one monitoring electrode has an opening,
wherein the reference electrode is configured to electrically connect the medium with a reference potential,
wherein the reference electrode extends through the opening.

This embodiment forms a simple and advantageous alternative to the solution taught in WO 2010/066518 A1 for monitoring a measuring device. It is particularly suitable for detecting abrasion by particles, such as, for example, suspended matter, sand, concrete, plaster and gravel, which, when the medium is being conducted, tend to sink and to continuously rub off the surface of the lining or the measuring pipe body. This is usually not done selectively, but rather over a larger region of the lower side of the measuring pipe, in which the reference electrode is also arranged. If the measurement signal determined between the reference electrode monitoring electrode deviates from a setpoint value, there is an increased probability of homogeneous abrasion.

One embodiment provides that the electrode assembly has at least two monitoring electrodes.

The at least two monitoring electrodes can be electrically connected to and communicate with the measuring circuit separately, or be electrically connected to one another. The first-mentioned embodiment has the advantage that the monitoring can take place in a spatially resolved manner.

The second-mentioned embodiment has the advantage that it can be easily implemented and can be realized using measuring circuits of already known magnetically-inductive flowmeters.

One embodiment provides that a first monitoring electrode of the at least two monitoring electrodes has a first internal diameter,
wherein a second monitoring electrode of the at least two monitoring electrodes has a second internal diameter,
wherein the first internal diameter differs from the second internal diameter.

If the at least two monitoring electrodes are electrically connected to the measuring circuit separately and the measuring circuit is configured to determine a measurement signal on the at least two monitoring electrodes, the degree of abrasion and the remaining thickness of the lining can be determined by the choice of the internal diameter.

One embodiment provides that the at least two monitoring electrodes are arranged offset from one another, in particular coaxially, in the longitudinal direction of the measuring pipe.

This embodiment forms an alternative to the monitoring electrodes with a stepped monitoring electrode body and makes it possible to determine an abrasion in a spatially resolved manner.

One embodiment provides that the first monitoring electrode is surrounded in the radial direction at least in a partial section by the second monitoring electrode.

If the second monitoring electrode has a length deviating from the length of the first monitoring electrode in the longitudinal direction, a remaining thickness of the lining can be determined on the basis of the measurement signal. With increasing abrasion, a galvanic contact arises first between the medium and the first or second monitoring electrode and subsequently between the second or first monitoring electrode and the medium. This is reflected in the measurement signal, regardless of whether the at least two monitoring electrodes interface with one another, or are measured separately by the measuring circuit.

One embodiment provides that the measuring circuit is configured to signal the presence of a defect, in particular an abrasion of the measuring pipe body or the lining, in the event of a deviation of the variable, which is a function of an electrical impedance, in particular of a phase shift from a setpoint value or from an acceptance range.

BRIEF DESCRIPTION OF THE DRAWINGS

The invention is explained in more detail with reference to the following figures, without limiting the invention thereto. The following are shown.

DETAILED DESCRIPTION

Figure 1:
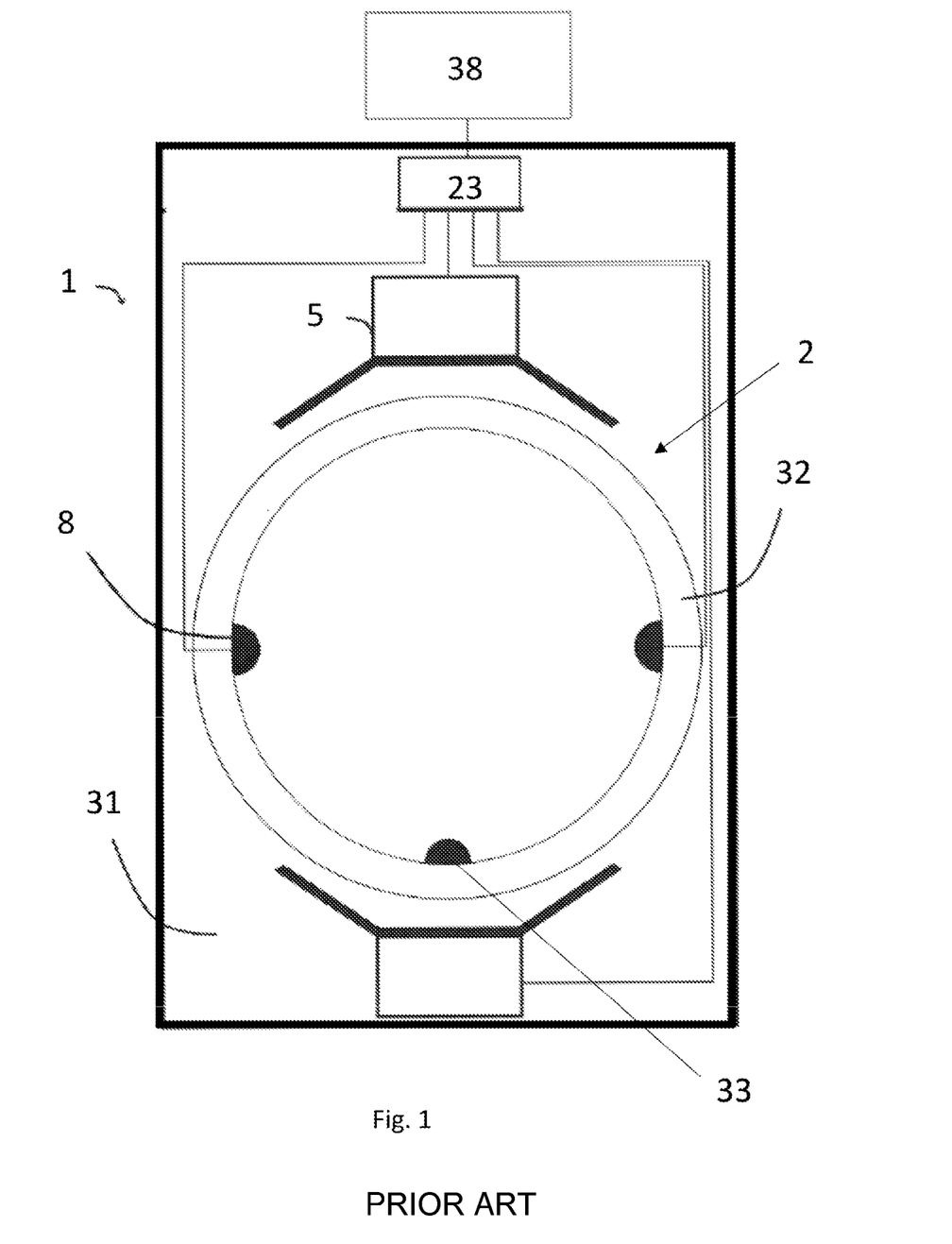
FIG. 1 shows a cross-sectional view of a magnetic-inductive flowmeter according to the prior art.

FIG. 1 shows a magnetic-inductive flowmeter 1 known from the prior art. The structure and measuring principle of a magnetic-inductive flowmeter 1 are known in principle. A medium having an electrical conductivity is conducted through a measuring pipe 2. The measuring pipe 2 can be designed, for example, as a carrier tube formed from metal with a lining applied on the inside, or comprise a measuring pipe body which is substantially formed from an electrically insulating material, such as plastic, ceramic, glass and/or concrete. A device 5 for generating a magnetic field is attached to the measuring pipe 2 such that the magnetic field lines are oriented substantially perpendicularly to a longitudinal direction defined by the measuring pipe axis. A saddle coil or a pole shoe with a mounted coil and coil core is preferably suitable as device 5 for generating the magnetic field. When the magnetic field is applied, a potential distribution is produced in the measuring pipe 2, which distribution is tapped with a device 8 for measuring an induced measurement voltage, preferably with two measuring electrodes attached to the inner wall of the measuring pipe 2. As a rule, these are arranged diametrically and form an electrode axis or are intersected by a transverse axis, which runs perpendicularly to the magnetic field lines and the axis of the measuring pipe. On the basis of the measurement voltage U measured, and taking into account the magnetic flux density, the flow rate of the medium can be determined and, taking into account the cross-sectional area of the tube, the volumetric flow rate can be determined. To prevent the measuring voltage applied to the first and second measuring electrodes from dissipating via a metallic carrier tube, the inner wall of the carrier tube is provided with an electrically insulating lining—a so-called liner. The magnetic field built up by the device, for example an electromagnet for generating a magnetic field is generated by a direct current of alternating polarity clocked by means of an operating circuit. This ensures a stable zero point and makes the measurement insensitive to influences due to electrochemical disturbances. A measuring circuit 23 is configured to read out the measurement voltage applied to the first measuring electrode and the second measuring electrodes. An evaluation circuit is configured to determine the flow rate and/or the volume flow of the medium and to output said medium for example via a display 38 to the user. Commercially available magnetic-inductive flowmeters 1 have further electrodes in addition to the measurement electrodes. For one thing, a fill level monitoring electrode (not shown in FIG. 1), which is optimally attached to the highest point in the measuring pipe 2, serves to detect partial filling of the measuring pipe 2 and is configured to pass this information to the user and/or to take into account the fill level when determining the volume flow. Furthermore, a reference electrode, which is usually attached diametrically with respect to the fill-level monitoring electrode, or at the lowest point of the pipe cross-section, serves to ensure sufficient grounding of the medium.

Figure 2:
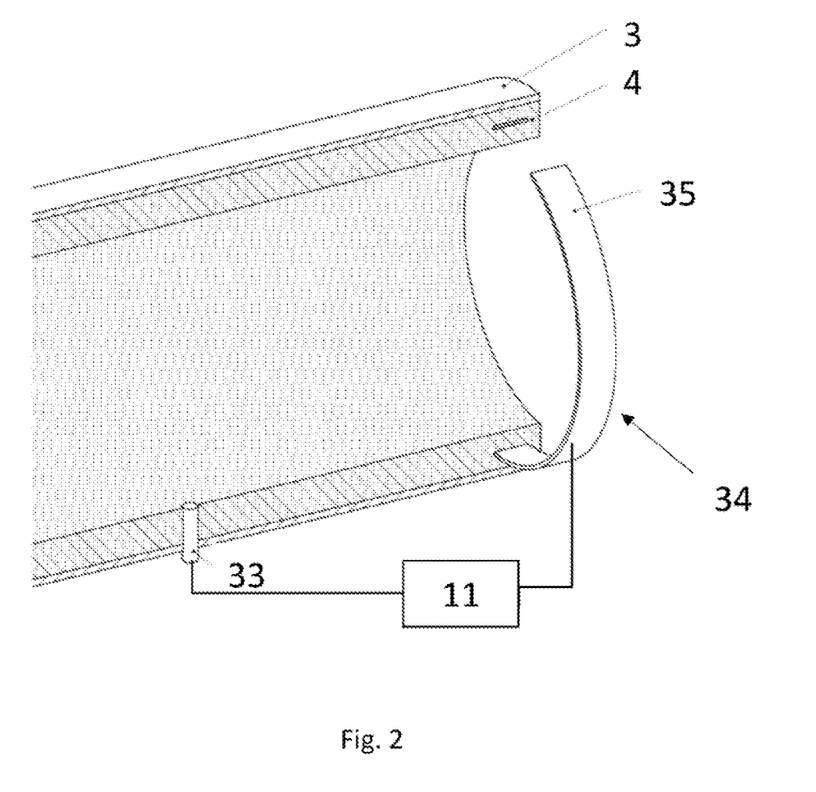
FIG. 2 shows a first embodiment of an electrode assembly according to the present disclosure for detecting damage to the measuring pipe body of a magnetic-inductive flowmeter.

FIG. 2 shows a first embodiment of the electrode assembly 34 for detecting damage to the measuring pipe body of a magnetic-inductive flowmeter 1. The magnetic-inductive flowmeter 1 comprises a measuring pipe 2 for conducting the medium with a measuring pipe body 32, which is electrically insulating in sections, and which in the depicted embodiment is formed by a carrier tube 3 and an electrically insulating liner 4 arranged on the inside, which extends on the inside of the carrier tube 3 along the longitudinal direction of the measuring pipe body. A reference electrode 33 extends through an opening provided in the carrier tube 3 and through the liner 4. The reference electrode 33 is designed to be in contact with the medium and is configured to electrically connect the medium to be conducted with a reference potential. Alternatively, the reference electrode 33 can also be embedded completely in the liner or in the electrically insulating measuring pipe body, just like the electrode assembly 34. The embodiments each show a reference electrode 33 designed as a pin electrode. In applications with a highly abrasive medium, brush electrodes, preferably made of steel, are also used. According to the invention, an electrode assembly 34 for detecting damage to the measuring pipe body 32 is arranged on the measuring pipe 2. According to the first embodiment, the electrode assembly 34 comprises a monitoring electrode 35 arranged on the input and/or on the output side. This is electrically insulated from the reference electrode 33 and the medium by the measuring pipe body 32. This is realized by embedding the monitoring electrode 35 in the electrically insulating liner 4. The at least one monitoring electrode 35 illustrated is hollow cylindrical or annular and oriented coaxially to the measuring pipe 2, in particular to the carrier tube 3. It has a longitudinal direction of the monitoring electrode and a material thickness D, which is constant in the longitudinal direction of the monitoring electrode. In addition, the monitoring electrode 35 is arranged offset from the reference electrode 33 in the longitudinal direction of the measuring pipe body. The reference electrode 33 is arranged in a measuring pipe section which is free of the electrode assembly 34, in particular the at least one monitoring electrode 35. The electrode assembly 34, in particular the at least one monitoring electrode 35, is electrically connected to a measuring circuit 11, which is configured to measure a variable that is a function of an electrical impedance between the electrode assembly 34, in the case of the at least one monitoring electrode 35, and the reference electrode 33. The variable that is a function of the electrical impedance can be a phase shift between the excitation signal and the measurement signal. The electrode assembly 34 can be electrically connected via an electrical conductor (not shown), which is likewise embedded in the lining and runs through a provided opening to the measuring circuit 11 arranged outside the measuring pipe 2.

The variable that is a function of the impedance is determined by applying an excitation signal with at least one frequency to the monitoring electrode 35. The measurement signal is determined at the monitoring electrode 35 against the reference electrode 33. The measuring circuit is configured accordingly.

The monitoring electrode 35 can be embedded in the lining or in the measuring pipe body as a separate component, in the form of a metallic ring, or alternatively can be realized by local doping of the plastic lining or by applying a conductive plastic.

All features which do not relate to the number, shape and position of the monitoring electrodes can also be applied to the subsequent embodiments.

Figure 3:
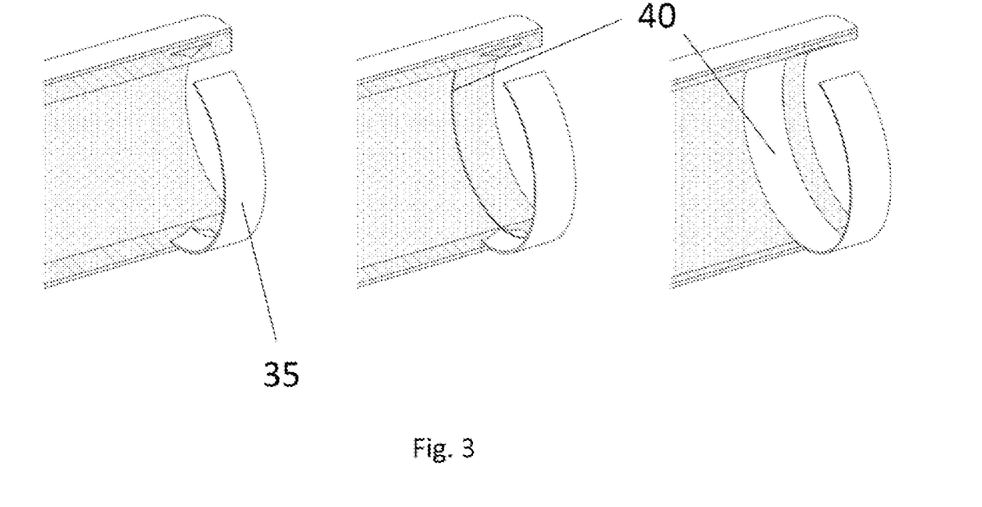
FIG. 3 shows a second embodiment of the electrode assembly according to the present disclosure.

FIG. 3 shows a second embodiment of the electrode assembly 34, which is particularly suitable for detecting a continuous decrease in the thickness of the lining by abrasion. For this purpose, the monitoring electrode 35 has a material thickness D, which increases at least partially continuously in the longitudinal direction of the monitoring electrode. According to the depicted embodiment, the material thickness D of the monitoring electrode 35 continuously increases starting from the outermost monitoring electrode cross-sections in the direction of a centrally oriented monitoring electrode cross-section. The monitoring electrode 35 tapers in the direction of a center point located on the longitudinal axis of the monitoring electrode.

The three representations show an idealized development of abrasion, with which the thickness of the liner and the monitoring electrode decreases homogeneously. With increasing abrasion, the thickness of the lining decreases from a contact surface 40 of the monitoring electrode to the medium, which becomes evident in the determined impedance. Depending on the material of the monitoring electrode, this too can be rubbed off by the abrasion. In this case, the variable material thickness D of the monitoring electrode 35 causes the contact surface 40 to likewise increase.

Figure 4:
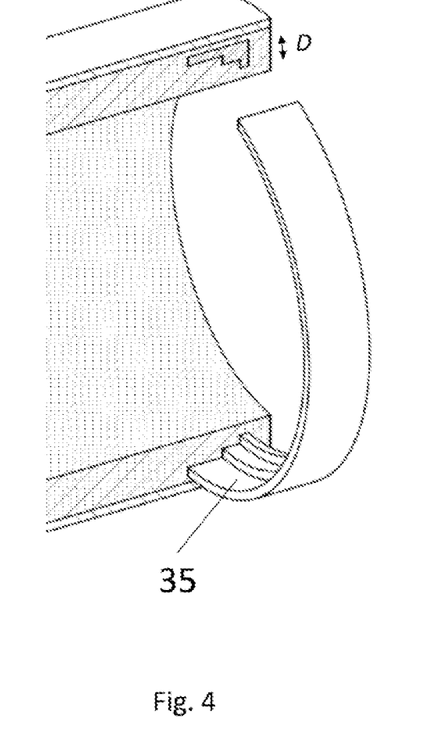
FIG. 4 shows a third embodiment of the electrode assembly according to the present disclosure with at least one stepped monitoring electrode.

FIG. 4 shows a third embodiment of the electrode assembly 34 with at least one stepped monitoring electrode 35. The depicted monitoring electrode 35 has a material thickness D, which increase in steps in the longitudinal direction of the monitoring electrode. The depicted variant of the monitoring electrode 35 has three steps. In the case of homogeneous abrasion of the lining and possibly also of the monitoring electrode 35, the variable that is a function of the impedance changes abruptly. Based on this change, a degree of abrasion or a remaining thickness of the lining can be determined.

Figure 5:
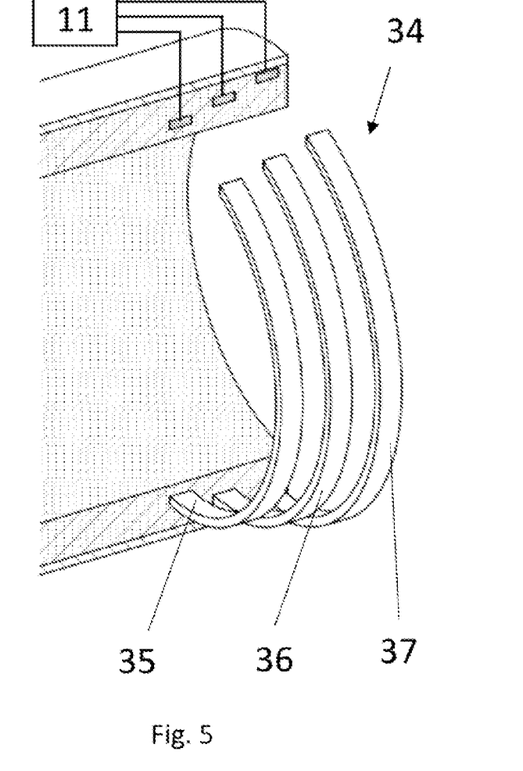
FIG. 5 shows a fourth embodiment of the electrode assembly according to the present disclosure with at least three monitoring electrodes.

FIG. 5 shows a fourth embodiment of an electrode assembly 34 with at least three monitoring electrodes 35, 36, 37. These are arranged in the measuring pipe on the input and/or on the output side and differ in each case in their internal diameters and external diameters. In addition, the at least three monitoring electrodes 35, 36, 37 are offset in the longitudinal direction of the measuring pipe and are arranged according to the size of the internal diameter. All the monitoring electrodes are electrically connected separately to the measuring circuit 11.

Alternatively, monitoring electrodes 35, 36, 37 can be provided with substantially the same external diameter, but in each case different internal diameters—i.e., different material thicknesses. In the case of a coaxial arrangement of the monitoring electrodes 35, 36, 37, these can be electrically interfaced with one another. With increasing abrasion, the total contact surface between the electrode assembly and the medium also increases, wherein the total contact surface results from the individual contact surfaces of the monitoring electrodes 35, 36, 37.

Figure 6:
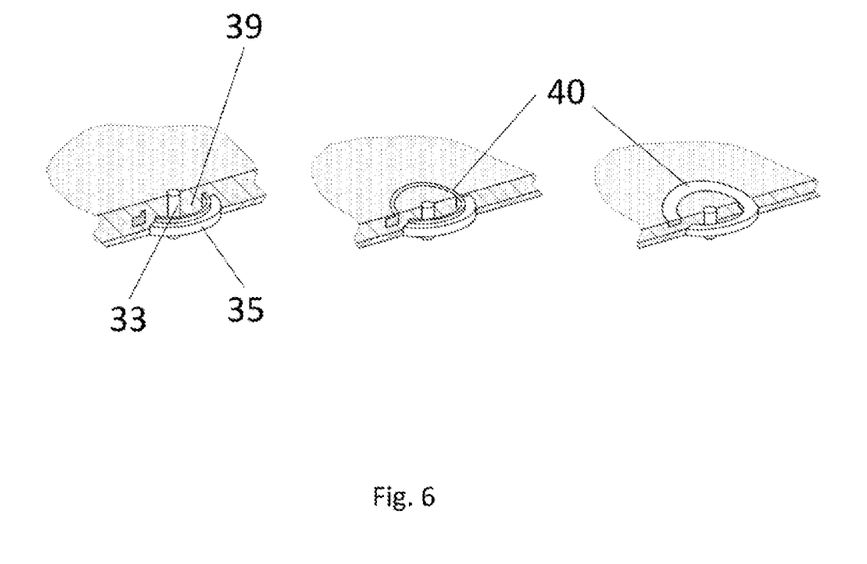
FIG. 6 shows a fifth embodiment of the electrode assembly according to the present disclosure.

FIG. 6 shows a fifth embodiment of the electrode assembly 34 with a monitoring electrode, which has an opening 39 through which the reference electrode 33 extends. The reference electrode 33, which extends through the measuring pipe body 32, is configured to electrically connect the medium with a reference potential. The monitoring electrode 35 has a material thickness D, which increases in steps in the longitudinal direction of the monitoring electrode. In the depicted embodiment, the monitoring electrode 35 has exactly two steps, each of which forms the material thicknesses that differ in sections.

As in FIG. 3, the three representations show an idealized development of abrasion in which the thickness of the liner and the monitoring electrode decreases homogeneously. With increasing abrasion, a contact surface 40 of the monitoring electrode to the medium increases, which becomes evident in the detected impedance.

Figure 7:
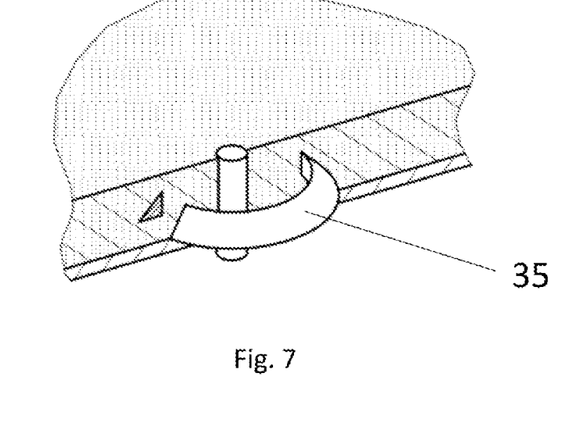
FIG. 7 shows a sixth embodiment of the electrode assembly according to the present disclosure.

FIG. 7 shows a sixth embodiment of the electrode assembly 34 with a monitoring electrode 35. Unlike in FIG. 6, the material thickness D increases in the direction of the longitudinal axis of the monitoring electrode. The monitoring electrode 35 has a triangular longitudinal sectional area in a longitudinal section.

Figure 8:
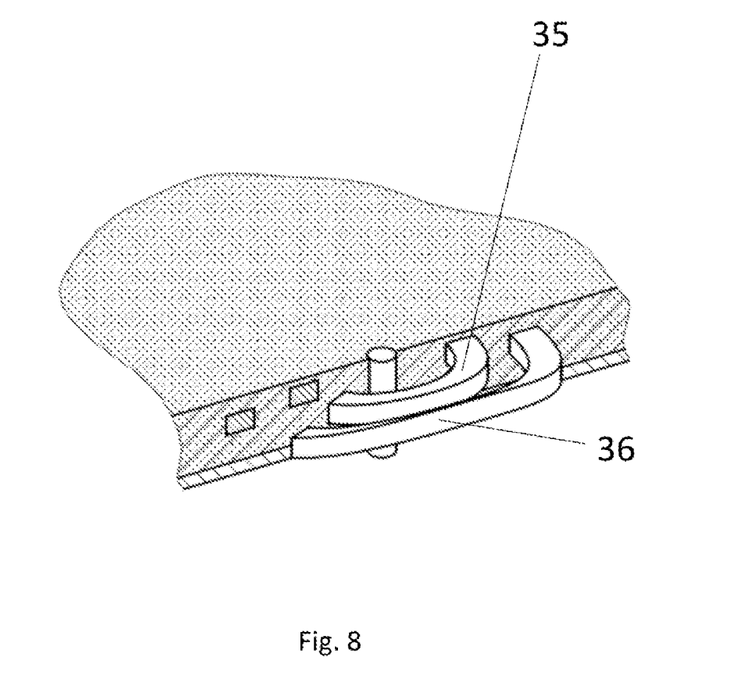
FIG. 8 shows a seventh embodiment of the electrode assembly according to the present disclosure with at least two monitoring electrodes.

FIG. 8 shows a seventh embodiment of the electrode assembly 34 with two monitoring electrodes 35, 36, which each surround the reference electrode 33 in the radial direction. The first monitoring electrode 35 and the second monitoring electrode 36 each have an opening. The reference electrode 33 extends through the respective opening. Alternatively, the first monitoring electrode 35 can also extend through the opening of the second monitoring electrode 36, as a result of which the first monitoring electrode 35 is enclosed at least in a partial section in the radial direction by the second monitoring electrode 36. In the depicted embodiment, the first monitoring electrode 35 is arranged offset in the direction of the longitudinal axis of the monitoring electrode from the second monitoring electrode 36. The first monitoring electrode 35 and the second monitoring electrode 36 can each be electrically connected to a measuring circuit, so that it can be determined separately when the monitoring electrode 35, 36 comes into contact with the medium.

For reasons of clarity, FIGS. 2 to 8 do not depict the device for generating the magnetic field penetrating the measuring pipe body or a device for detecting an induced voltage, which is a function of the flow rate, in the medium.

The invention claimed is:

1. A magnetic-inductive flowmeter, the flowmeter comprising:
    a measuring pipe adapted to conduct a medium, wherein the measuring pipe comprises a measuring pipe body, which is electrically insulating in sections;
    a device configured to generate a magnetic field that penetrates the measuring pipe;
    a device configured to detect an induced voltage, which is a function of a flow rate in the medium;
    a reference electrode;
    an electrode assembly configured to detect damage to the measuring pipe body, wherein the electrode assembly is electrically insulated from the reference electrode and/or the medium by the measuring pipe body, and
    wherein the electrode assembly includes at least one monitoring electrode, which defines a monitoring electrode longitudinal direction, wherein the at least one monitoring electrode has a material thickness, which in the monitoring electrode longitudinal direction increases in steps, at least in part; and
    a measuring circuit configured to measure a variable that is a function of an electrical impedance between the electrode assembly and the reference electrode.

2. The flowmeter of claim 1, wherein the at least one monitoring electrode is at least partially hollow cylindrical or annular.

3. The flowmeter of claim 2, wherein the measuring pipe body defines a pipe body longitudinal direction of the measuring pipe body, wherein the at least one monitoring electrode is oriented coaxially to the measuring pipe body and is arranged offset to the reference electrode in the pipe body longitudinal direction.

4. The flowmeter of claim 3, wherein the at least one monitoring electrode of the electrode assembly includes at least two monitoring electrodes.

5. The flowmeter of claim 4, wherein:
    a first monitoring electrode of the at least two monitoring electrodes has a first internal diameter;
    a second monitoring electrode of the at least two monitoring electrodes has a second internal diameter; and
    the first internal diameter differs from the second internal diameter.

6. The flowmeter of claim 5, wherein the at least two monitoring electrodes are arranged offset from each other in the pipe body longitudinal direction.

7. The flowmeter of claim 5, wherein the at least two monitoring electrodes are arranged offset from each other coaxially in the pipe body longitudinal direction.

8. The flowmeter of claim 5, wherein the first monitoring electrode is enclosed, at least in a partial section, in a radial direction by the second monitoring electrode.

9. The flowmeter of claim 1, wherein:
    the reference electrode extends through the measuring pipe body;
    the reference electrode is configured to electrically connect the medium with a reference potential;
    the at least one monitoring electrode defines an opening therethrough; and
    the reference electrode extends through the opening.

\* \* \* \* \*